US009288156B2

(12) United States Patent
Smith et al.

(10) Patent No.: US 9,288,156 B2
(45) Date of Patent: Mar. 15, 2016

(54) METHOD AND APPARATUS FOR SUPPORTING SCALABLE MULTI-MODAL DIALOG APPLICATION SESSIONS

(71) Applicant: Nuance Communications, Inc., Burlington, MA (US)

(72) Inventors: Kenneth W. D. Smith, London (GB); Solomon Z. Lerner, Sharon, MA (US); Caroline Drouin, New York, NY (US); Shimol Shah, Pleasonton, CA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/677,169

(22) Filed: Apr. 2, 2015

(65) Prior Publication Data

US 2015/0244642 A1 Aug. 27, 2015

Related U.S. Application Data

(63) Continuation of application No. 13/759,186, filed on Feb. 5, 2013, now Pat. No. 9,026,659.

(51) Int. Cl.
*G06F 15/173* (2006.01)
*H04L 12/923* (2013.01)
*H04L 12/24* (2006.01)
*H04L 29/08* (2006.01)
*H04L 29/06* (2006.01)

(52) U.S. Cl.
CPC .......... *H04L 47/762* (2013.01); *H04L 65/1083* (2013.01); *H04L 67/14* (2013.01); *H04L 67/142* (2013.01); *H04L 12/2425* (2013.01); *H04L 29/06176* (2013.01); *H04L 29/08576* (2013.01); *H04L 29/08621* (2013.01); *H04L 41/0803* (2013.01); *H04L 65/1069* (2013.01)

(58) Field of Classification Search
CPC ..... H04L 47/762; H04L 67/14; H04L 67/142; H04L 65/1083; H04L 29/08621; H04L 29/06176; H04L 12/2425; H04L 29/08576; H04L 41/0803; H04L 65/1069
See application file for complete search history.

(56) References Cited

U.S. PATENT DOCUMENTS

| 7,363,539 | B1 | 4/2008 | Mitrov |
| 9,026,659 | B2 | 5/2015 | Smith et al. |
| 2006/0184535 | A1 | 8/2006 | Kaluskar et al. |
| 2006/0291481 | A1 | 12/2006 | Kumar |
| 2010/0325419 | A1 | 12/2010 | Kanekar |
| 2010/0325420 | A1 | 12/2010 | Kanekar |
| 2013/0117359 | A1 | 5/2013 | Husain et al. |

*Primary Examiner* — Krisna Lim
(74) *Attorney, Agent, or Firm* — Hamilton, Brook, Smith & Reynolds, P.C.

(57) ABSTRACT

Embodiments disclosed herein enable scaling up and making advanced natural language (NLU) applications more robust. According to one embodiment, state(s) associated with a dialog session may be recorded to a non-transitory medium. The dialog session may be suspended after a given period of inactivity and later automatically awakened based on unique client, session, or device identifier, or any combination thereof. Memory and resources associated with the suspended session may be reclaimed, the memory and resources being otherwise held by the session during the period of inactivity, enabling higher density (e.g., a larger number of sessions supported). Embodiments disclosed herein obviate a need for sticky dialog sessions, enabling higher density, and may further failover protection and fault tolerance for the dialog sessions.

20 Claims, 7 Drawing Sheets

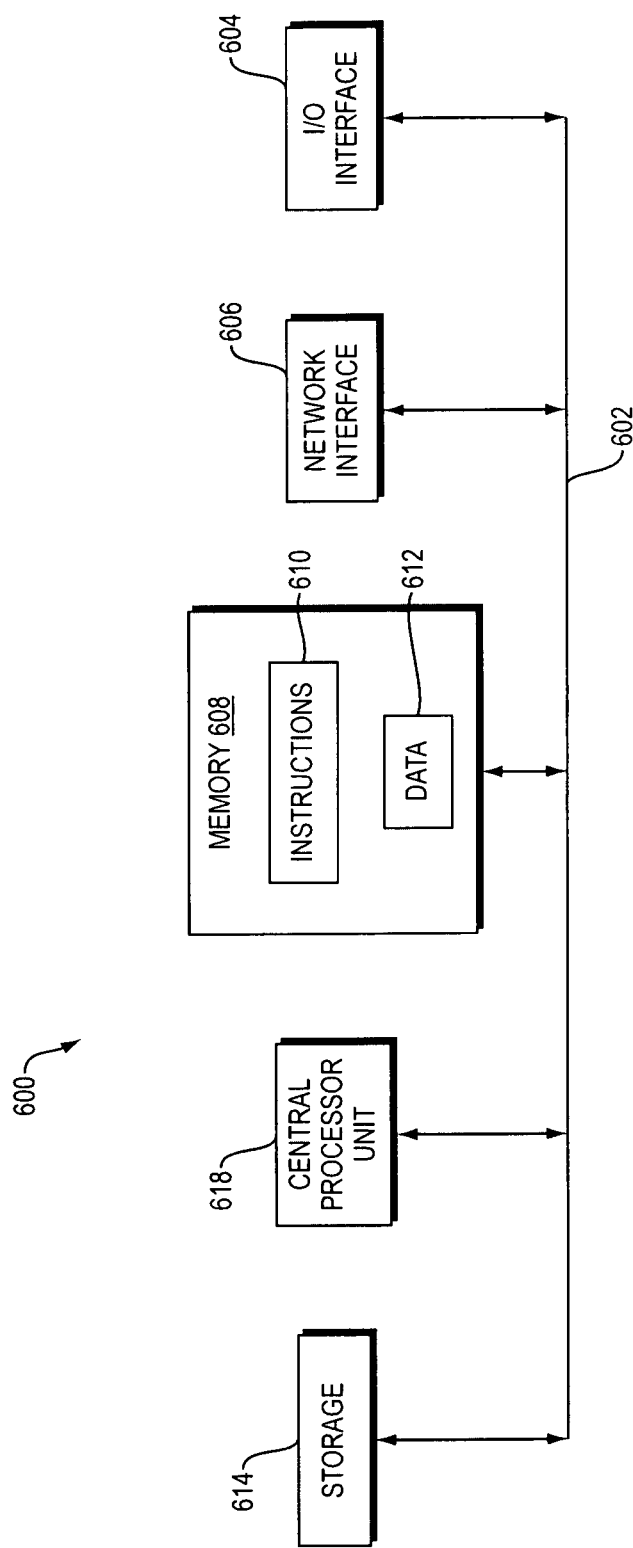

METHOD AND APPARATUS FOR SUPPORTING SCALABLE MULTI-MODAL DIALOG APPLICATION SESSIONS

RELATED APPLICATION

This application is a continuation of U.S. application Ser. No. 13/759,186, filed Feb. 5, 2013, now U.S. Pat. No. 9,026,659, issued on May 5, 2015. The entire teachings of the above application are incorporated herein by reference.

BACKGROUND OF THE INVENTION

Typical Web applications may invalidate a session which has remained idle beyond a set period of time. Once a session has been marked as invalid, the associated session resources may be reclaimed.

SUMMARY OF THE INVENTION

A method, corresponding system, apparatus, and non-transient computer-readable medium employed in conjunction with a dialog application are disclosed herein.

An example embodiment includes a method for maintaining a plurality of dialog sessions of a multi-modal dialog application in a server. The method may store session state information for at least one dialog session of the plurality of dialog sessions in the server. The at least one dialog session may have reserved resources for session operation. The method may automatically suspend the at least one dialog session based on a configurable setting of the at least one dialog session. The method may release at least a portion of the resources having been reserved by the at least one dialog session suspended. The method may further automatically resume the at least one dialog session suspended, with the session state information stored, based on a unique identifier and a detected interaction with the multi-modal dialog application.

Another example embodiment for a method for maintaining a plurality of dialog sessions of a multi-modal dialog application in a server may include storing session state information for at least one suspended dialog session of a plurality of dialog sessions with the multi-modal dialog application in the server, the session state information including a unique identifier. The method may reduce an amount of the session state information stored. The method may release resources associated with at least the amount reduced. The method may automatically resume the at least one suspended dialog session with the reduced session state information stored based on the unique identifier and a detected interaction with the multi-modal dialog application.

Storing the session state information may include storing the session state information locally or enabling the session state information to be stored remotely. The identifier may be a client identifier, session identifier, device identifier, or combination thereof. The server may be a web server and the multi-modal dialog application may optionally be a frequently-asked-questions (FAQ) application interacting by accepting queries and providing responses to the queries accepted.

The configurable setting may include options for storing based on at least one of the following: (i) a specified timeout configured to be less than a session timeout configured for the at least one dialog session, (ii) providing a response to a user and immediately suspending the at least one dialog session, or (iii) providing a specified number of responses to the user.

The session state information may optionally include at least one session attribute for disambiguation. The method may further comprise updating the session state information stored for the at least one dialog session suspended and reducing an amount of the session state information stored. The method may further comprise releasing resources associated with at least the amount reduced, and automatically resuming may include resuming with the session state information stored and updated.

The method may further comprise serializing the session state information and automatically resuming may include pulling the session state information serialized and stored. Automatically resuming may further include de-serializing the session state information serialized, stored, and pulled.

The method may further comprise encrypting the session state information serialized and pulling may include decrypting the session state information serialized, encrypted, and stored.

The session state information may include one or more data structures including at least one of the following: (i) information related to a user, (ii) disambiguation information for the at least one dialog session, (iii) a dialog history for the at least one dialog session, wherein the dialog history is a reduced dialog history based on a disambiguation context for the at least one dialog session (iv) information related to a middleware application communicatively coupled to the multi-modal dialog application wherein the middleware application provides the information related to the user, or (v) an identifier of at least one log file used by the at least one dialog session suspended, wherein the automatically resuming may further include writing to the at least one log file located based on the identifier.

The method may further comprise performing analytics based on the user's behavioral usage of the multi-modal dialog application. Performing the analytics may be based on at least one of the following: computing statistics related to types of queries provided by the user or computing times that reflect busy times for the user's usage of the multi-modal dialog application.

The server may be a web server and storing may include storing the session state information on a database, file system, memory cache, or any combination thereof, coupled to the web server. The database, file system, memory cache, or any combination thereof, may be shared, enabling a cluster of web servers to share the session state information stored.

The cluster of web servers may be configured to perform load balancing enabling improved response times of the multi-modal dialog application, and the multi-modal dialog application may optionally be an FAQ application.

Another example embodiment disclosed herein includes an apparatus corresponding to operations consistent with the method embodiments described above.

Further, yet another example embodiment may include a non-transitory computer-readable medium having stored thereon a sequence of instructions which, when loaded and executed by a processor, causes the processor to complete methods disclosed herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 6 is a block diagram of an example internal structure of a computer optionally within an embodiment disclosed herein.

DETAILED DESCRIPTION OF THE INVENTION

Figure 1:
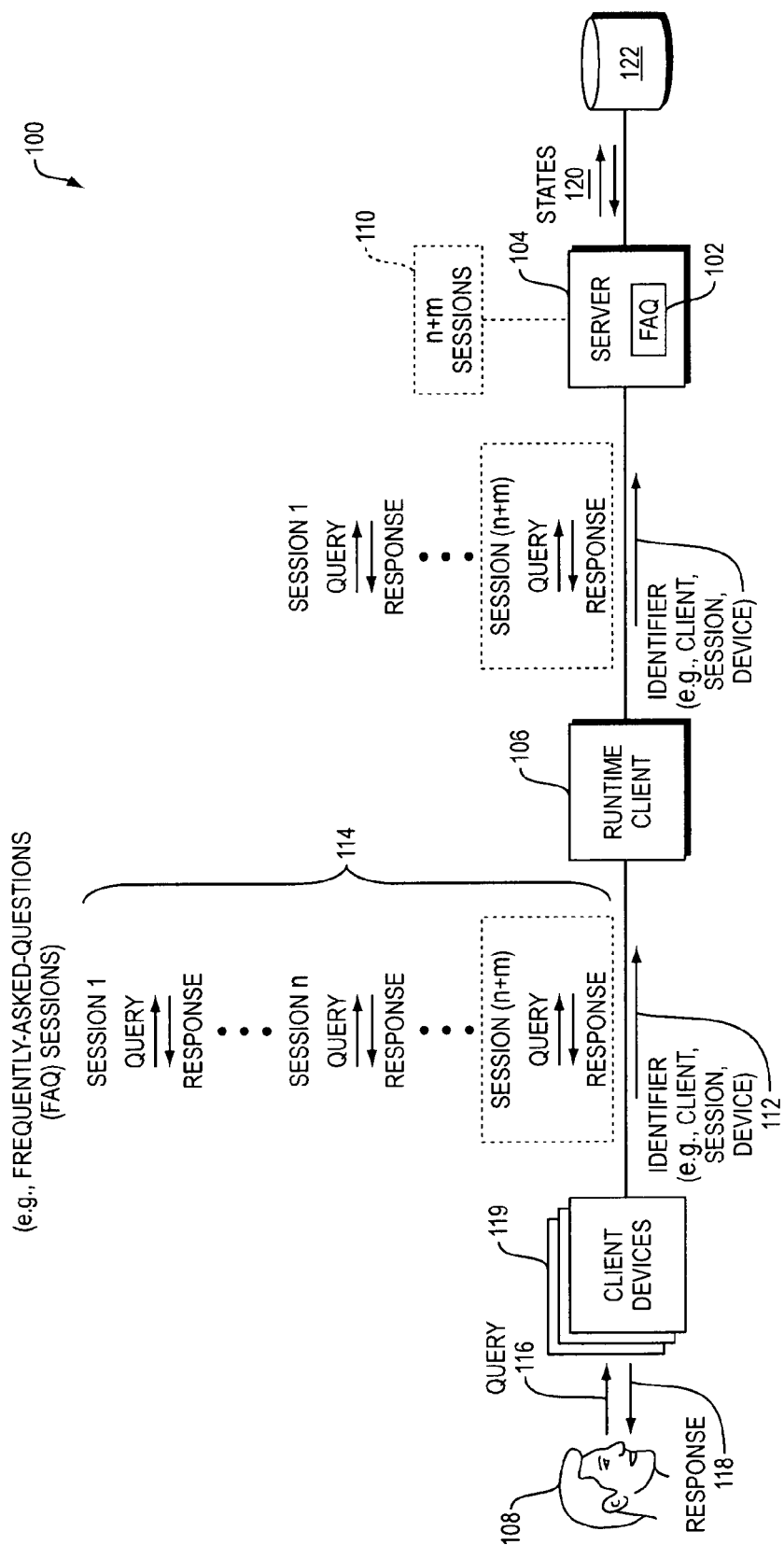
FIG. 1 is a block diagram of a dialog system according to an embodiment of the present invention.

A description of example embodiments of the invention follows.

Invaliding idle sessions and reclaiming the invalidated idle session's resources does not meet the needs of an application which may support sessions that may idle for long periods of time, such as an advanced human-machine dialog interaction session.

Advanced human-machine dialog interaction sessions may include subsequent turns of the human with the system. An FAQ application is an example application that may include human-machine dialog interaction. An advanced NLU application, such as an FAQ application, may include dialog interaction sessions that support long idle periods, such as idle periods exceeding twenty minutes. Such dialog sessions cannot be marked invalid as the human may wish to interact further at a later time. However, maintaining each dialog session as active may present a disadvantage because the resources and memory for the dialog sessions maintained cannot be used by later sessions; thus, scaling in such a design is limited due to the finite amount of resources and memory available for the dialog sessions.

The example dialog sessions of an FAQ application may accept questions and provide answers relating to products, services, subscriptions, features, versions, procedures, etc. The FAQ application may be an advanced natural language understanding (NLU) application. The FAQ application may classify questions and other information from a user into one of many categories and effectuate a response to be provided to the user. The response may include an answer to the user's question or may include a prompt for more information from the user.

For example, if a meaning of the user's question is not clear, the FAQ application may prompt the user for more information in order to narrow the scope of possible responses. As such, a user's interaction with an FAQ application may include a series of questions and responses, interrupted by an occasional prompt to help find the best response to return to the user. The user may not respond to the prompt for a considerably long period of time, forcing the dialog sessions to remain valid in order to respond to the user at the time that the user provides further information in response to the prompt.

Thus, session resources of an advanced human-machine dialog interaction, such as an FAQ application, or other suitable application, may need to be maintained for exceedingly long periods of time, limiting the number of sessions that may be supported due to a finite amount of resources available to the sessions. NLU applications may maintain state, such as dialog history and so forth, within memory. As such, NLU applications may force an architecture that requires 'sticky sessions', sessions that remain active until terminated by the user, and which bind the user to the same Web Server in order to maintain and route each subsequent turn with the same server to the same endpoint, such as the user's device (also referred to herein as an endpoint or client device).

In addition to user response latency, the dialog sessions themselves may be prone to response latencies. For example, sessions being supported by Java Virtual Machine (JVM) may incur latency due to JVM operations, such as a JVM garbage collection cycle. A Web Server, virtual machine, physical device, or other suitable device that serves an endpoint, such as a user's device employed in conjunction with an FAQ or other suitable application, may be required to guarantee active sessions in order to prevent failure seen at the user's device (also referred to herein as an endpoint or client device). However, maintaining active sessions over long periods of time may limit the number of active sessions that may be supported, as the Web Server, virtual machine, physical device, or other suitable device, may have finite memory and other resources available for session use.

According to embodiments disclosed herein, a session, such as dialog session of an advanced NLU application, may be automatically suspended rather than configured to time-out after a period of inactivity and invalidated based on the time-out. In contrast, embodiments disclosed herein enable suspension of a session, such as an advanced NLU dialog session, and serialization of the dialog management history associated with the NLU dialog sessions. According to one embodiment, a second, non-terminal timer may be configured to trigger before a session timeout timer triggers, enabling suspension of the dialog session and preventing invalidation of the dialog session based on inactivity.

According to one embodiment, state(s) associated with a dialog session may be recorded to a fixed medium and utilized by the dialog session upon resumption of the dialog session. The dialog session may be suspended after a given period of inactivity and later automatically awakened (e.g., resumed) based on unique client, session, or device identifier, or any combination thereof. Memory and resources associated with the suspended session may be reclaimed, the memory and resources being otherwise held by the session during the period of inactivity, enabling higher density (e.g., a larger number of sessions supported).

Embodiments disclosed herein obviate a need for sticky dialog sessions, enable higher density, and provide failover protection and fault tolerance for the dialog sessions. By maintaining session state between protracted turns of the human with the dialog interaction session, embodiments disclosed herein enable an application, such as a multi-modal application or other suitable application, to maximize the density on each node that performs the related session processing. According to embodiments disclosed herein, a server, such as a Web server, may be configured to suspend a session automatically and reclaim resources of the suspended session as a turn completes and the response is sent to a client device (also referred to herein as an endpoint or user device) utilized by a user.

FIG. 1 is a block diagram of a dialog system 100 according to an embodiment of the present invention. The dialog system 100 may include a multi-modal dialog application, such as a frequently-asked-questions (FAQ) application 102 that runs on a server 104. The server 104 may be a web server, or any other suitable server. It should be understood that the multi-modal dialog application may be any suitable multi-modal dialog application and is not restricted to an FAQ type application included in the example embodiment. In the example embodiment, the server 104 may respond to input 116 from a user 108. A client application 106 may pass the input 116 to the server 104 and may pass a response 118 from the server 104 back to the user 108. The user 108 may use one or more client devices 119 configured to interact with a multi-modal dialog application, such as the FAQ application 102. The client device 119 may be a smart phone, laptop, tablet, web browser, messaging client, or any other suitable client device.

The FAQ application 102 may be an NLU application that may classify questions and other information (116) from a user 108 into one of many categories and effectuate a response 118 to be provided to the user 108. The response 118 may include an answer to the user's question or may include a prompt for more information from the user 108. For example, if a meaning of the user's input (e.g., a question provided by the user via text or speech) is not clear, the FAQ application 102 may prompt the user 108 for more information in order to narrow the scope of possible responses.

Thus, a user's interaction with the FAQ application 102 may include a series of questions and responses, interrupted by an occasional prompt to help find the best response in a list of answers maintained within the FAQ application 102. The FAQ application 102 may accept questions and provide answers relating to products, services, subscriptions, features, versions, procedures, or any other suitable information.

The client application 106 may receive data from the user 108 before starting a session, such as an FAQ dialog session 114. For example, the user 108 may supply information related to the user, such as an address, or simply a postal code. The client application 106 may compare the postal code to stored postal codes and start an FAQ session. In this example, turns with the system may include dialog, such as "Before we begin, please enter your postal code," from the client application 106 to the user 108, and a postal code, such as "55555," from the user 108 to the client application 106. Upon receiving the postal code information from the user, the client application 106 may start an FAQ session, supplying the postal code as a session attribute, and play (e.g., send) a prompt to the user 108, such as "Okay, how can I help you today?" Turns with the system may follow as the user 108 provides further information regarding the query and the client application 106 in conjunction with the FAQ application 102 provides further responses and prompts to the user 108. At each turn with the system, session state information 120 may be stored and the session suspended and later resumed based on the user 108 interaction.

Disambiguation may be in focus at the time of session suspension depending upon whether or not the system is in the process of clarifying a customer's query. Disambiguation may be useful for narrowing choices when there is a list of potential responses, or when the correct response depends on an additional piece of information. Disambiguation may or may not be in focus at each turn with the system. For example, a user 108 that has not provided a postal code may provide a query, such as "What's the cheapest service plan that you provide?" In response, the client application 106 in conjunction with the FAQ application 102 may respond to the user 108 by providing a prompt, such as "Well that depends upon where you live. What is your postal delivery code?" Thus, in this example, disambiguation may be in focus in order to further disambiguate.

As described, interaction with the FAQ application 102 may include dialog, such as a series of questions and responses, interrupted by an occasional prompt provided by the FAQ application 102 to help find the best response in a list of ambiguous answers. For example, if the meaning of the user's input is not clear, the FAQ application 102 may prompt the user 108 for more information to disambiguate the user's input in order to narrow the scope of possible responses. The FAQ application 102 may use a mechanism, such as disambiguation, to enable clarification of the meaning of a question, narrow the scope of a search for responses, and control which responses are delivered to which users.

According to embodiments disclosed herein, multiple sessions, such as n+m dialog sessions 110, may be supported by the server 104. According to embodiments disclosed herein, the need for sticky sessions may be obviated, enabling n+m dialog sessions to be supported instead of n sessions. For example, because inactive sessions cannot be invalidated, sticky sessions maintain all of the memory and resources associated with a dialog session. Due to a finite amount of memory and resources available, only n sessions may be supported. In contrast, embodiments disclosed herein may support n+m sessions because state information 120 associated with a dialog session may be recorded to a fixed medium 122.

Embodiments disclosed herein may suspend the dialog session after a given period of inactivity and later automatically awaken the sessions based on unique client, session, or device identifier, or any combination thereof (112). A unique client identifier may identify the user 108, a unique session identifier may identify the dialog session 114, and a unique device identifier may identify a user's device 119. Embodiments disclosed herein enable memory and resources associated with the suspended session may be reclaimed, the memory and resources being otherwise held by the session during the period of inactivity.

Embodiments disclosed herein may efficiently serialize the session state 120 of an advanced dialog session to a fixed medium 122, such as a local disk, database, file system, memory cache, off-board file share, off-board database, off-board RAM drive, or other suitable storage medium. Also any backend connection may be closed. Embodiments disclosed herein may automatically resume an advanced dialog session on a subsequent turn with the system from the user and any backend connections may be re-opened based on the advanced dialog session being automatically resumed.

Embodiments disclosed herein may clear the dialog history, fully or partially prior to suspension, depending on whether disambiguation is in focus, enabling a reduced amount of serialized session state information to be stored.

According to another embodiment, the locations of written log files, such as call logs or diagnostic logs, may be recorded enabling a resumed dialog session to resume utilization of the same logs utilized by the session prior to session suspension.

Embodiments disclosed herein may enable configuration for session suspension. For example, embodiments disclosed herein may enable sessions to be configured with a suspend timeout of infinite length, a fixed duration measured in seconds, or other suitable duration of time, or a timeout that takes effect immediately as each turn with the system ends. By providing configuration for session suspension, a tradeoff between minor degradation in session response time and an immediate reclamation of resources at the conclusion of each turn with the system may be enabled.

According to another embodiment, sessions, such as dialog sessions, may be resumed utilizing a recently updated configuration of the multi-modal dialog application. For example, the FAQ application 102 may have been hot-updated during a time of session suspension. Embodiments disclosed herein may enable resumption of the dialog session suspended utilizing configuration and resources hot-updated during a time of session suspension. Further, according to yet another embodiment, the FAQ application 102, or other suitable application, may be upgraded (e.g., updated) between turns with the system, transparently to the session suspended. Further, user information may be included in the session state information stored and such information, for example, a user's postal code or other suitable information provided by the user or associated with the user, may be updated during the time that the session is suspended and the updated user information may be utilized by the session based on session resumption.

Figure 2:
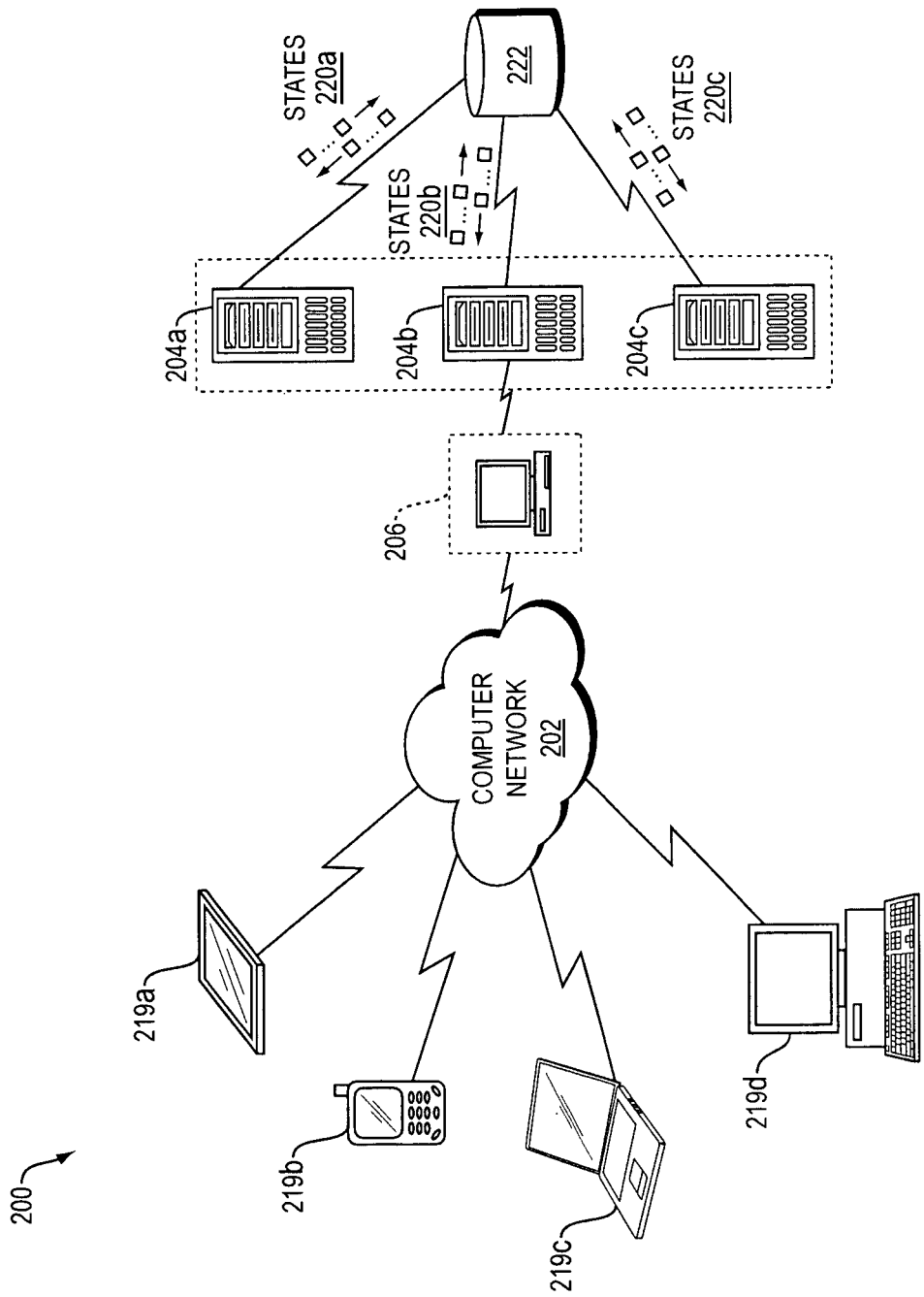
FIG. 2 is a block diagram of an embodiment of an environment for an example dialog system.

FIG. 2 is a block diagram 200 of an embodiment of an environment 200 for an example dialog system. The environment 200 includes a computer network 202. The computer network 202 may be wide-area network (WAN), such as the Internet, wireless network, local-area network (LAN), cellular network, or other suitable type of network. The environment 200 may include client devices 219a-d that may be in communication with a client application 206 and one or more servers 204a-c that provide an FAQ application, or other suitable multi-modal application.

The servers 204a-c may be Web servers configured as a cluster 224. The servers 204a-c may be configured to store session state information 220a-c on a shared database 222, file system, memory cache, or any combination thereof, coupled to the servers 204a-c. Embodiments disclosed herein may enable the servers 204a-c to share their respective state information 220a-c among the cluster 224 of Web servers for a particular client device 219a-d, thus enabling a localized load balancing scheme to be provided for the applications utilized by the client devices 219a-d among the servers in the cluster. By providing load balancing, embodiments disclosed herein may enable temporary declines in response times, such as FAQ response times, to be circumvented. For example, a decline in response time may be due to a JVM garbage collection cycle on a server in the cluster 224, or other virtual machine cycle.

Further, by storing state information on the shared database 222 embodiments disclosed herein enable failover protection and fault tolerance for the dialog sessions. For example, a suspended session may be resumed by any server 204a-c in the cluster 224. Thus, if a server 204a-c fails, embodiments disclosed herein enable another server to resume the session.

According to embodiments disclosed herein, state information may be shared among a distributed collection of servers 204a-c in the cluster 224. The cluster 224 of web servers may be configured to perform load balancing enabling improved FAQ response times. Embodiments disclosed herein may enable the servers 204a-c to be integrated in a manner such that the servers 204a-c work cooperatively by utilizing Web Server technologies and enabling suspension of a session and intelligent reclamation of session resources. According to embodiments disclosed herein, a server, such as a Web server, may be configured to automatically suspend a session and reclaim resources of the suspended session as a turn completes and the response is sent to a client device utilized by a user.

Communication between the client application 206 and one or more servers, such as the servers 204a-c, may be via Hypertext Transfer Protocol (HTTP), or any other suitable protocol. The client application 206 may establish a control session with one or more of the servers 204a-c, and may refer to each unique resource by a Uniform Resource Locator (URL), for example, via an Remote Procedure Call (RPC) invocation. A Protocol Data Unit (PDU) utilized in the messaging between the client application 206 and the one or more servers 204a-c may be textual, and may utilize an ISO 10646 character set in the UTF-8 encoding (RFC 3629) to enable many different languages to be represented. A flow of messages between the client application 206 and the one or more servers 204a-c may include client requests and server responses.

For example, the client application 206 may request a session start. At least one server in the cluster 224 may establish a session and respond to the client application 206. The client application 206 may extract a unique session identifier from the response, and use the session identifier extracted in all future requests for that session. The client application 206 may parse HTTP headers and a message body, such as Java-Script Object Notation (JSON) message body, and update the particular client device 219a-d used by a user (not shown) to interact with the application, such as an FAQ application (not shown) on the one or more servers 204a-c, as needed. A client application 206 may send a request to the one or more servers 204a-c requesting that the session end.

After receiving and interpreting the request message, a server resource may respond with a response message. Each HTTP response may return a single result, which can contain more than one value expected by the client application 206. The response-body may carry information from the one or more servers 204a-c to the client applications 206. The message body may be encoded in JSON data interchange format (RFC4627). Each JSON response may include a request structure that details the original request, and returns a unique session identifier that may be used throughout the session's existence. The session identifier may be used to describe failures, as applicable, and to convey performance metrics. The response may also include a dialog structure that may include prompts and results for the client application 206 to communicate to the particular client device 219a-d utilized by the user.

The client application 206 may send a request to the one or more servers 204a-c, such as FAQ servers, to start a new session. Starting a new FAQ session may also be referred to herein as starting a new call, or user conversation. The one or more servers 204a-c may create a new session for each new call. The server may return a unique session identifier for the user conversation, and optionally a default prompt. The client application 206 may use the unique session identifier in subsequent messages during the session. For subsequent messages sent to the session identifier, the client application 206 may be on the alert for a failed response from the server. The client application 206 may handle a failed response by trapping an error response that may follow from the server. The client application 206 may be configured to receive responses from the one or more servers 204a-c and parse a dialog structure included in the response and send appropriate responses to the client device based on the dialog structure parsed.

Embodiments disclosed herein enable scaling up of sessions and may increase the robustness of an application, such as an advanced NLU application, by providing access to session dialog state across a distributed topology of servers. Thus, session resumption may be provided from a load-balanced local cluster server configuration, enabling response times, such as FAQ response times, to be increased.

Figure 3A:
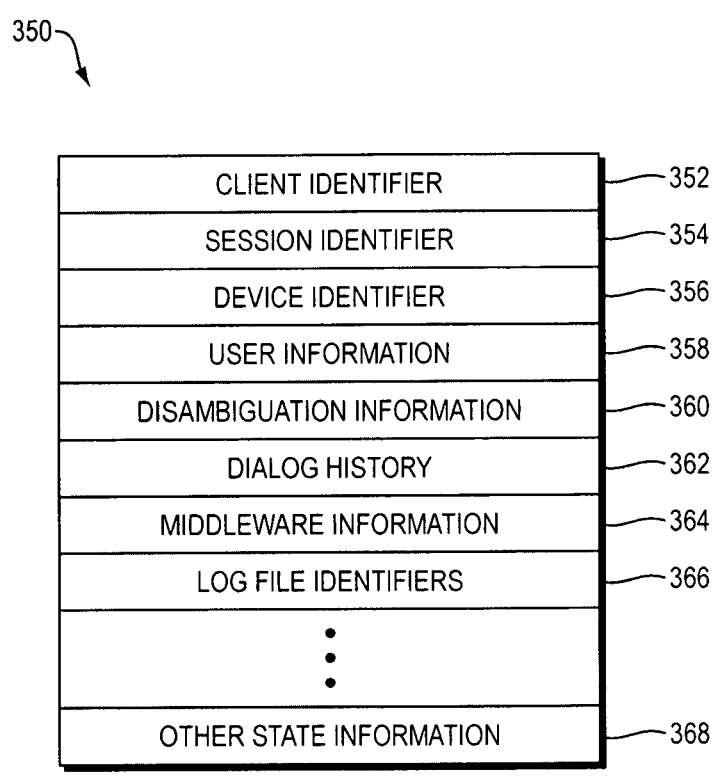
FIG. 3A is a table of an embodiment of session state information.

FIG. 3A is a table 350 of an embodiment of session state information. Session state information may include a unique client identifier 352, a unique session identifier 354, a client device identifier 356, information associated with a user 358, disambiguation information 360, dialog history 362, middleware information 364 (e.g., information associated with the client application), log file identifiers 366 that may identify information (e.g., filename, location, etc.) associated with the log files, or any other state information 368 that may be associated with the FAQ session itself, client device, client application, session, or server supporting the FAQ session, or other suitable multi-modal dialog application session.

Figure 3B:
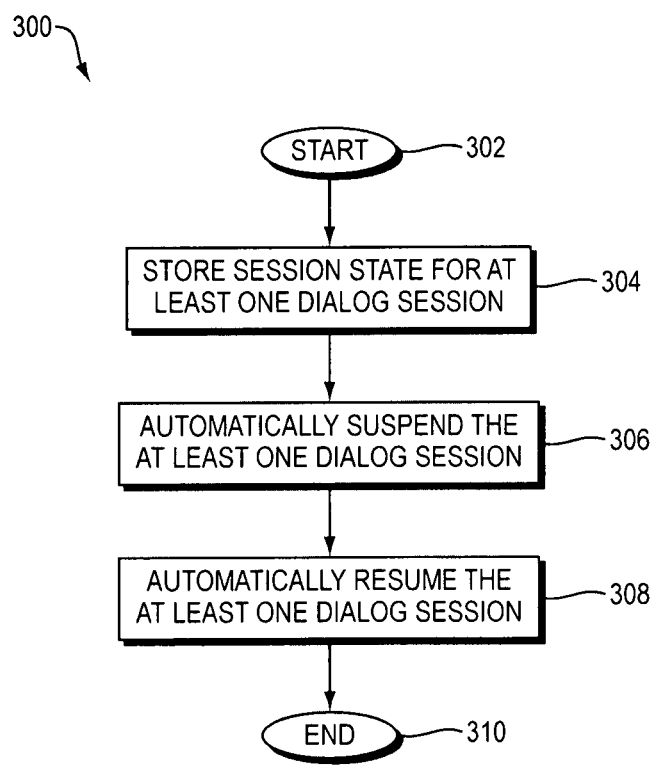
FIG. 3B is flow diagram of an embodiment of a method for maintaining a plurality of dialog sessions of a multi-modal dialog application in a server.

FIG. 3B is an example flow diagram 300 of an embodiment of a method for maintaining a plurality of dialog sessions of a multi-modal dialog application in a server. The method may start (302) and store session state information for at least one dialog session of the plurality of dialog sessions in the server (304). The at least one dialog session may have reserved resources for session operation. The method may automatically suspend the at least one dialog session based on a configurable setting of the at least one dialog session and the method may release at least a portion of the resources having been reserved by the at least one dialog session suspended (306). The method may further automatically resume the at least one dialog session suspended, with the session state information stored, based on a unique identifier and a detected interaction of a user with the multi-modal dialog application (308) and the method thereafter ends (310) in the example embodiment.

Figure 4:
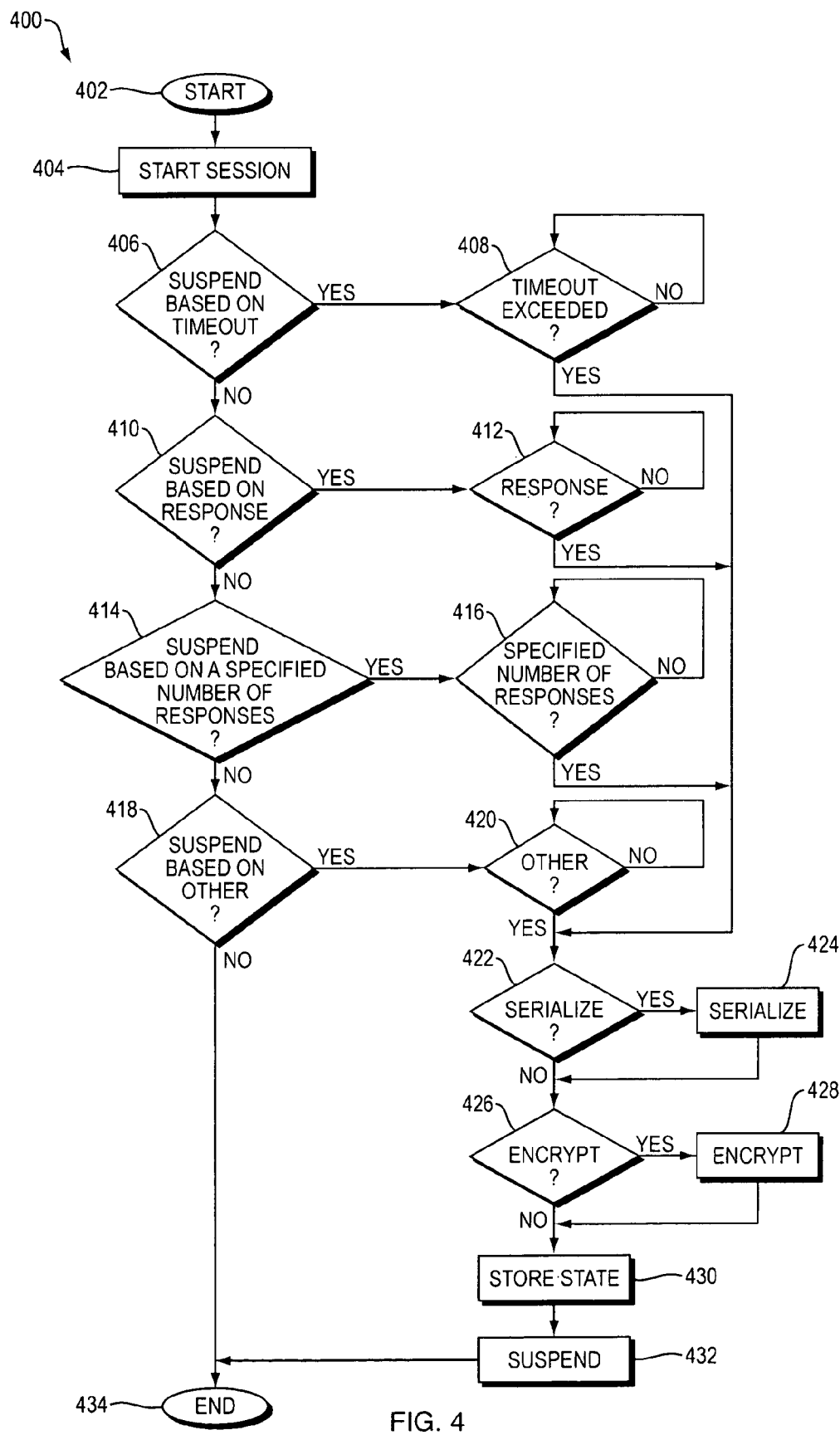
FIG. 4 is flow diagram of an embodiment of a method for suspending a dialog session of a multi-modal dialog application in a server.

FIG. 4 is flow diagram 400 of an embodiment of a method for suspending a dialog session of a multi-modal dialog application in a server. The method may start (402), and start a session, such as a dialog session (404). The method may check for whether or not the dialog session should be suspended based on a suspend timeout (406). If yes, the method may wait for the suspend timeout to be exceeded (408). If the suspend timeout is exceeded, the method may check for whether or not to serialize the session state information (422). If yes, the method may serialize the session state information (424). Regardless of whether or not the session state information is to be serialized, the method may check for whether or not to encrypt the session state information serialized or non-serialized (426). If the session state information serialized or non-serialized is to be encrypted, the method may encrypt the serialized or non-serialized session state information (428). Regardless of whether or not the serialized or non-serialized session state information is encrypted, the method may store the serialized or non-serialized state information, encrypted or non-encrypted, and the session may be suspended (432) and the method thereafter ends (434) in the example embodiment.

If however, the check for whether or not the dialog session should be suspended based on a suspend timeout (406) is no, the method may check for whether or not to provide a response to the user and immediately suspend the dialog session (410). If yes, the method may wait for a response (412). If a response is received, the method may check for whether or not to serialize the session state information (422) and so forth, similar to the subsequent flow described above. If however, the check for whether or not to suspend based on a response (410) is no, the method may check for whether or not to suspend the dialog session based on providing a specified number of responses to the user (414).

If yes, the method may wait for the specified number of responses to be received (416) and if the specified number of responses is received the method may check for whether or not to serialize the session state information (422) and so forth, similar to the subsequent flow described above. If no, the method may check for whether or not to suspend the dialog session based on other suitable suspension criteria (418). If yes, the method may wait for the other suitable suspension criteria (420) and the method may check for whether or not to serialize the session state information (422) and so forth, similar to the subsequent flow described above. If no the method thereafter ends (434) in the example embodiment.

Figure 5:
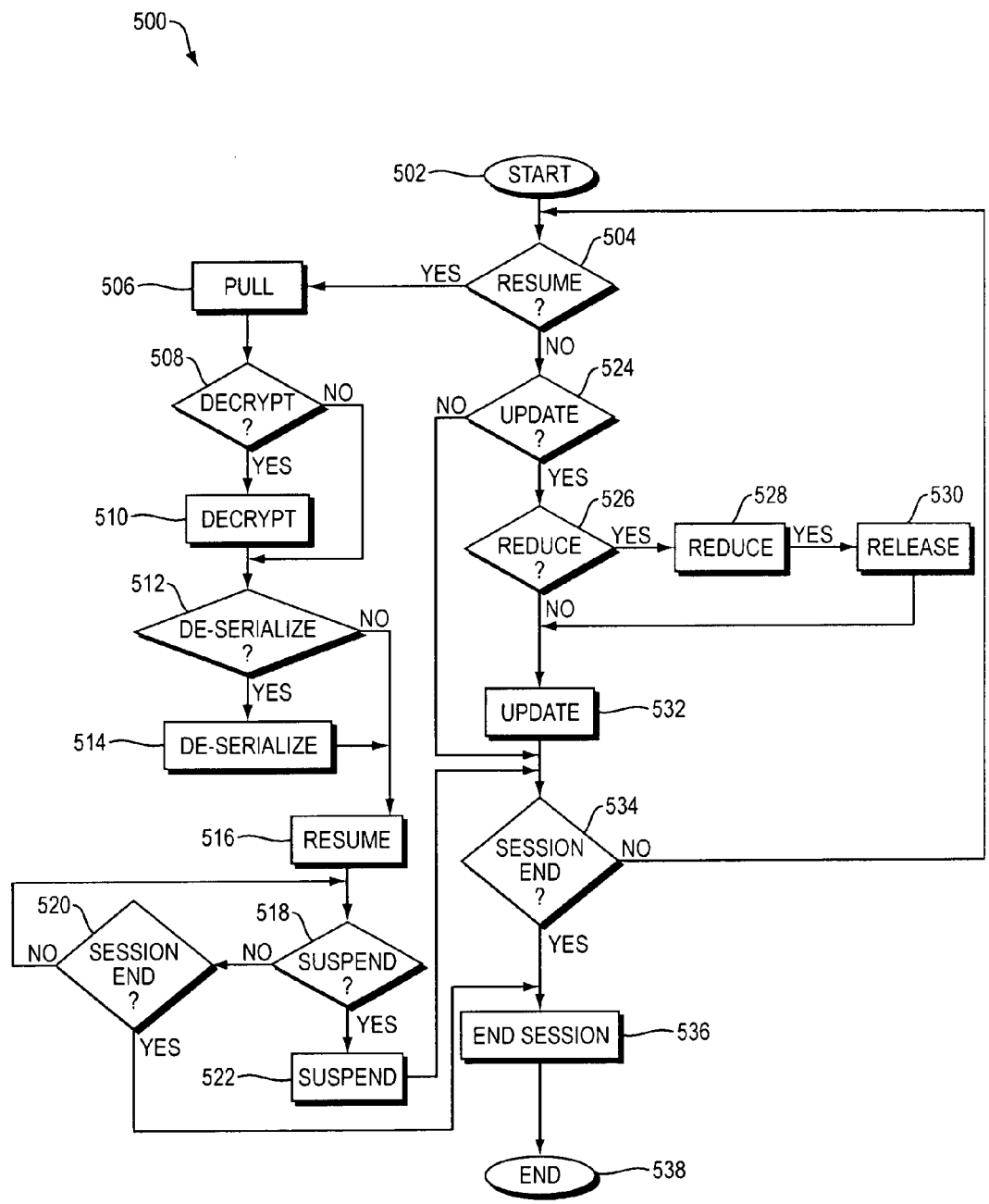
FIG. 5 is flow diagram of yet another embodiment of a method for resuming a suspended dialog session of a multi-modal dialog application in a server.

FIG. 5 is flow diagram 500 of an embodiment of a method for resuming a suspended dialog session of a multi-modal dialog application in a server. The method may start (502) and check whether or not to resume a dialog session suspended with the session state information stored based on a unique identifier and a detected interaction of a user with the multi-modal dialog application (504). If yes, the method may pull the session state information stored (506). The method may check for whether or not to decrypt the session state information pulled (508). If yes, the method may decrypt the session state information pulled (510). Regardless of whether or not the session state information pulled is decrypted, the method may check for whether or not to de-serialize the session state information pulled and decrypted or not decrypted (512). If yes, the method may de-serialize the session state information serialized, stored, and pulled (514) and resume the session (516).

The method may further check for whether or not to suspend the dialog session (518). If no, the method may check for whether or not to end the session (520). If no, the method may again check for whether or not to suspend the session (518). If however, the check to end the session (520) is yes, the method may end the session (536) and the method thereafter ends (538) in the example embodiment.

If the check for whether or not to suspend the session (518) is yes, the method may suspend the session (522) and check for whether or not to end the session (534). If the check for ending the session (534) is no, the method may further check for whether or not to resume the suspended session (504).

If the check for whether or not to resume the session (504) is no, a check may be made for whether or not to update the session state or other resource information associated with the session (524). If no, the method may further check for whether or not to end the suspended session (534) and so forth. If however, the check of whether or not to update (524) is yes, the method may check for whether or not to reduce an amount of the session state information stored (526). If yes, the method may reduce the amount (528) and release resources associated with at least the amount reduced (530) an update the session state information stored (532). The method may further check for whether or not the session should end (534). If no, the method may further check for whether or not to resume the session (504) and if yes, the method may resume the session with the session state information stored and updated. If however, the check for whether or not to update the session state information (524) is no, the method may check for whether or not the session should end (534) and so forth.

FIG. 6 is a block diagram of an example of the internal structure of a computer 600 in which various embodiments of the present invention may be implemented. The computer 600 contains a system bus 602, where a bus is a set of hardware lines used for data transfer among the components of a computer or processing system. The system bus 602 is essentially a shared conduit that connects different elements of a computer system (e.g., processor, disk storage, memory, input/output ports, network ports, etc.) that enables the transfer of information between the elements. Coupled to the system bus 602 is an I/O device interface 604 for connecting various input and output devices (e.g., keyboard, mouse, displays, printers, speakers, etc.) to the computer 600. A network interface 606 allows the computer 600 to connect to various other devices attached to a network. Memory 608 provides volatile storage for computer software instructions 610 and data 612 that may be used to implement embodiments of the present invention. Disk storage 614 provides non-volatile storage for computer software instructions 610 and data 612 that may be used to implement embodiments of the present invention. A central processor unit 618 is also coupled to the system bus 602 and provides for the execution of computer instructions.

Further example embodiments of the present invention may be configured using a computer program product; for example, controls may be programmed in software for implementing example embodiments of the present invention. Further example embodiments of the present invention may include a non-transitory computer-readable medium containing instructions that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method for maintaining a plurality of dialog sessions of a multi-modal dialog application in a server, the method comprising:
   storing session state information for at least one suspended dialog session of a plurality of dialog sessions with the multi-modal dialog application in the server, the session state information including a unique identifier;
   reducing an amount of the session state information stored;
   releasing resources associated with at least the amount reduced; and
   automatically resuming the at least one suspended dialog session with the reduced session state information stored based on the unique identifier and a detected interaction with the multi-modal dialog application.

2. The method of claim 1 wherein the at least one suspended dialog session was suspended automatically based on a configurable setting of the at least one suspended dialog session and optionally wherein the session state information includes a session attribute for disambiguation.

3. The method of claim 2 further wherein the configurable setting includes options for storing based on at least one of the following: (i) a specified timeout configured to be less than a session timeout configured for the at least one suspended dialog session, (ii) providing a response to a user and immediately suspending the at least one dialog session, or (iii) providing a specified number of responses to the user.

4. The method of claim 1 wherein storing the session state information includes storing the session state information locally or enabling the session state information to be stored remotely, and further wherein the unique identifier is a client identifier, session identifier, device identifier, or combination thereof, and still further wherein the server is a web server and optionally wherein the multi-modal dialog application is a frequently-asked-questions (FAQ) application interacting by accepting queries and providing responses to the queries accepted.

5. The method of claim 1 further comprising:
   serializing the session state information, wherein automatically resuming includes pulling the session state information serialized and stored and further wherein automatically resuming includes de-serializing the session state information serialized, stored, and pulled.

6. The method of claim 5 further comprising encrypting the session state information serialized and still further wherein pulling includes decrypting the session state information serialized, encrypted, and stored.

7. The method of claim 1 wherein the session state information includes one or more data structures including at least one of the following: (i) information related to a user, (ii) disambiguation information for the at least one suspended dialog session, (iii) a dialog history for the at least one suspended dialog session, wherein the dialog history is a reduced dialog history based on a disambiguation context for the at least one suspended dialog session (iv) information related to a middleware application communicatively coupled to the multi-modal dialog application wherein the middleware application provides the information related to the user, or (v) an identifier of at least one log file used by the at least one suspended dialog session, wherein the automatically resuming further includes writing to the at least one log file located based on the identifier.

8. The method of claim 1 further comprising:
   performing analytics based on a user's behavioral usage of the multi-modal dialog application, wherein performing the analytics is based on at least one of the following: computing statistics related to types of queries provided by the user or computing times that reflect busy times for the user's usage of the multi-modal dialog application.

9. The method of claim 1 wherein the server is a web server and further wherein storing includes storing the session state information on a database, file system, memory cache, or any combination thereof coupled to the web server and still further wherein the database, file system, memory cache, or any combination thereof is shared enabling a cluster of web servers to share the session state information stored.

10. The method of claim 9 wherein the cluster of web servers is configured to perform load balancing enabling improved response times of the multi-modal dialog application, and optionally wherein the multi-modal dialog application is an FAQ application.

11. An apparatus for maintaining a plurality of dialog sessions of a multi-modal dialog application, the apparatus comprising:
    a processor;
    at least one memory coupled to the processor, the at least one memory having stored thereon a sequence of instructions which, when loaded and executed by the processor, causes the processor to:
       store session state information for at least one suspended dialog session of a plurality of dialog sessions with the multi-modal dialog application, the session state information including a unique identifier;

reduce an amount of the session state information stored;

release resources associated with at least the amount reduced; and automatically resume the at least one suspended dialog session with the reduced session state information stored based on the unique identifier and a detected interaction with the multi-modal dialog application.

12. The method of claim 11 wherein the at least one suspended dialog session was suspended automatically based on a configurable setting of the at least one suspended dialog session and optionally wherein the session state information includes a session attribute for disambiguation.

13. The apparatus of claim 12 wherein the configurable setting includes options for storing based on at least one of the following: (i) a specified timeout configured to be less than a session timeout configured for the at least one dialog session, (ii) providing a response to a user, or (ii) providing a specified number of responses to the user.

14. The method of claim 11 wherein storing the session state information includes storing the session state information locally or enabling the session state information to be stored remotely, and further wherein the unique identifier is a client identifier, session identifier, device identifier, or combination thereof, and still further wherein the server is a web server and optionally wherein the multi-modal dialog application is a frequently-asked-questions (FAQ) application interacting by accepting queries and providing responses to the queries accepted.

15. The apparatus of claim 11 wherein the sequence of instructions further causes the processor to store including serializing the session state information and further wherein the sequence of instructions causes the processor to automatically resume including pulling the session state information serialized and stored and still further wherein the sequence of instructions still further causes the processor to automatically resume including de-serializing the session state information serialized, stored, and pulled.

16. The apparatus of claim 15 wherein the sequence of instructions further causes the processor to encrypt the session state information serialized and further wherein the sequence of instructions still further causes the processor to decrypt the session state information serialized, encrypted, stored, and pulled.

17. The apparatus of claim 11 wherein the session state information includes one or more data structures and further wherein the one or more data structures includes at least one of the following: (i) information related to a user, (ii) disambiguation information for the at least one dialog session, (iii) a dialog history for the at least one dialog session, wherein the dialog history is a reduced dialog history based on a disambiguation context for the at least one dialog session, (iv) information related to a middleware application communicatively coupled to the multi-modal dialog application where the middleware application provides the information related to the user, or (v) an identifier of at least one log file used by the at least one dialog session suspended, wherein automatically resuming further includes writing to the at least one log file located based on the identifier.

18. The apparatus of claim 11 wherein the sequence of instructions further causes the processor to:

perform analytics based on a user's behavioral usage of the multi-modal dialog application, wherein performing the analytics is on at least one of the following: computing statistics related to types of queries provided by the user or computing times that reflect busy times for the user's usage of the multi-modal dialog application.

19. The apparatus of claim 11 wherein the server is a web server and further wherein the sequence of instructions further causes the processor to store the session state information on a database, file system, memory cache, or a combination thereof coupled to the web server and still further wherein the database, file system, memory cache, or combination thereof is shared enabling a cluster of web servers to share the session state information stored.

20. A non-transitory computer-readable medium having stored thereon a sequence of instructions which, when loaded and executed by a processor, causes the processor to:

store session state information for at least one suspended dialog session of a plurality of dialog sessions with a multi-modal dialog application, the session state information including a unique identifier;

reduce an amount of the session state information stored;

release resources associated with at least the amount reduced; and automatically resume the at least one suspended dialog session with the reduced session state information stored based on the unique identifier and a detected interaction with the multi-modal dialog application.

* * * * *